United States Patent
Lee et al.

(10) Patent No.: US 10,859,018 B1
(45) Date of Patent: Dec. 8, 2020

(54) EXHAUST GAS PURIFICATION SYSTEM USING THREE-WAY CATALYST AND METHOD OF CONTROLLING THE SAME

(71) Applicants: HYUNDAI MOTOR COMPANY, Seoul (KR); KIA MOTORS CORPORATION, Seoul (KR)

(72) Inventors: Dong-Hoon Lee, Gunpo-si (KR); Pyung-Hyun Han, Seoul (KR); Ki-Joon Lee, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/821,533

(22) Filed: Mar. 17, 2020

(30) Foreign Application Priority Data

Dec. 17, 2019 (KR) .................. 10-2019-0169088

(51) Int. Cl.
  *F02D 41/02* (2006.01)
  *F01N 3/10* (2006.01)
  *F02D 41/14* (2006.01)

(52) U.S. Cl.
  CPC ......... *F02D 41/0295* (2013.01); *F01N 3/101* (2013.01); *F02D 41/1458* (2013.01)

(58) Field of Classification Search
  CPC ............. F01N 2430/06; F01N 2430/00; F01N 2430/08; F01N 2430/085; F01N 2430/10; F01N 2430/02; F01N 2430/04; F01N 2900/1624; F01N 3/101; F01N 9/00; F01N 9/007; F02D 2200/0816; F02D 2200/0814; F02D 41/0295
  See application file for complete search history.

(56) References Cited

U.S. PATENT DOCUMENTS

| | | | | |
|---|---|---|---|---|
| 6,637,194 B2 * | 10/2003 | Kakuyama | .......... | F02D 41/1456 60/285 |
| 6,854,262 B2 * | 2/2005 | Yoshizawa | .......... | F02D 41/0295 60/276 |
| 8,522,531 B2 * | 9/2013 | Matsumoto | ......... | F02D 41/1454 60/277 |

(Continued)

FOREIGN PATENT DOCUMENTS

KR  10-0444445 B  8/2004

*Primary Examiner* — Sizo B Vilakazi
(74) *Attorney, Agent, or Firm* — Brinks Gilson & Lione (57) ABSTRACT

A method of purifying exhaust gas discharged from an engine using a three-way catalyst may include: calculating, by a controller, an oxygen mass flow rate flowing into the three-way catalyst based on an air-fuel ratio and an exhaust gas flow rate measured by a front oxygen sensor arranged at a front end of the three-way catalyst; calculating, by the controller, an oxygen storage capacity (OSC) and an oxygen storage amount (OSA) of the three-way catalyst by integrating the oxygen mass flow rate; correcting, by the controller, the calculated oxygen storage amount based on an actual voltage measurement value of the exhaust gas measured by a rear oxygen sensor arranged at a rear end of the three-way catalyst; and controlling, by the controller, a control variable related to performance of the three-way catalyst based on the corrected oxygen storage amount and the oxygen storage capacity.

11 Claims, 5 Drawing Sheets

(56) References Cited

U.S. PATENT DOCUMENTS

| | | | |
|---|---|---|---|
| 2008/0147297 A1* | 6/2008 | Nakagawa | F02D 41/1441 701/103 |
| 2010/0217506 A1* | 8/2010 | Mizoguchi | F02D 41/1454 701/109 |
| 2012/0317960 A1* | 12/2012 | Sato | F02D 41/0295 60/276 |

* cited by examiner

FIG.5 ic # EXHAUST GAS PURIFICATION SYSTEM USING THREE-WAY CATALYST AND METHOD OF CONTROLLING THE SAME

CROSS-REFERENCE TO RELATED APPLICATION

This application claims priority to and the benefit of Korean Patent Application No. 10-2019-0169088, filed on Dec. 17, 2019, the entire contents of which are incorporated herein by reference.

FIELD

The present disclosure relates to an exhaust gas purification system using three-way catalyst and a method of controlling the same.

BACKGROUND

The statements in this section merely provide background information related to the present disclosure and may not constitute prior art.

In order to satisfy ever-intensifying emission regulations, technologies for reducing vehicle emissions have been actively developed. In this regard, for reducing emissions before post-treatment, systems are being developed such as exhaust gas circulation (EGR) systems, or continuously variable valve duration (CVVD) systems that continuously change the opening and closing timings of cylinder valves. In addition, regarding an exhaust gas purification technology using a catalyst, efforts are being made to reduce the amount of precious metals contained in the catalyst while improving the purification ability of the catalyst.

Figure 5:
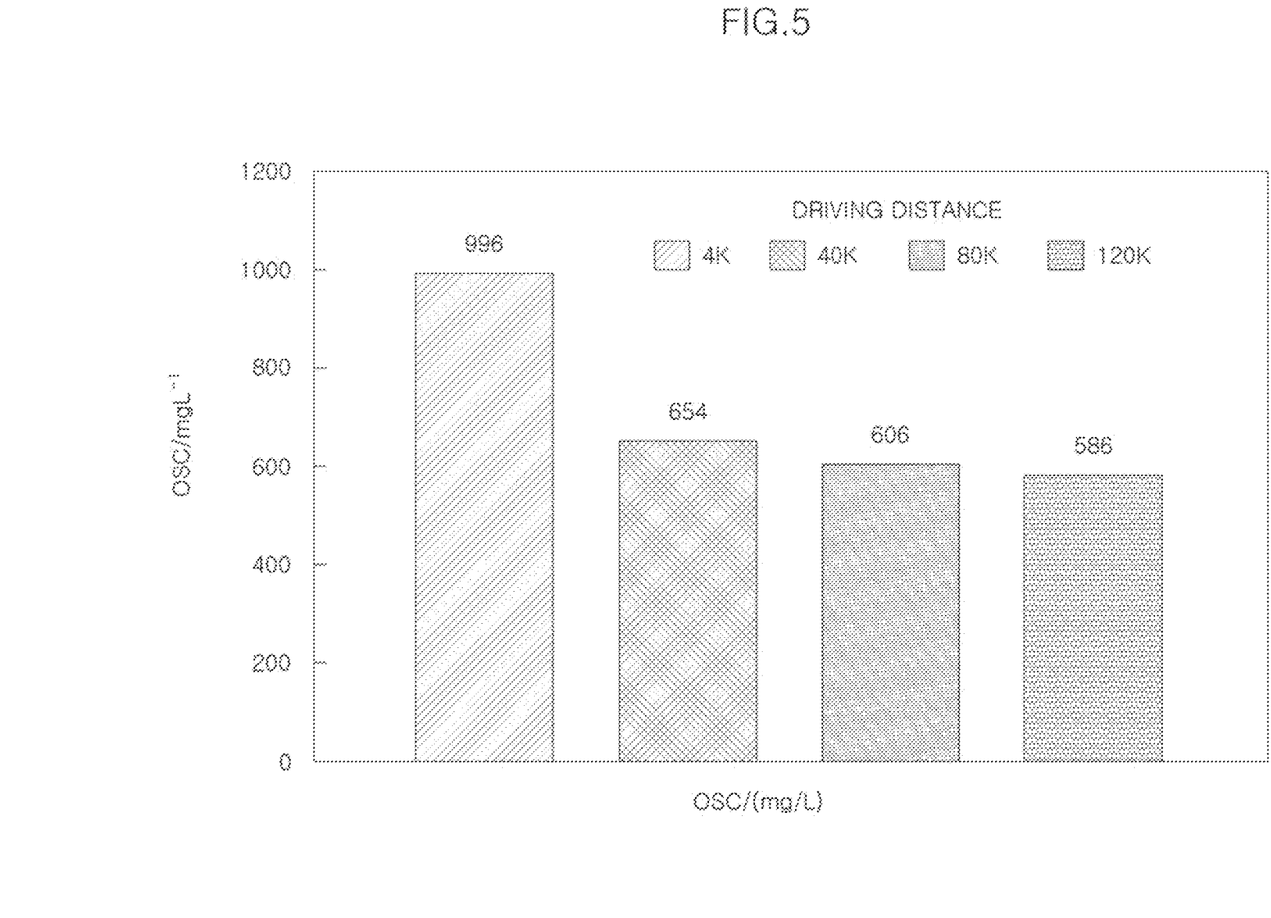
FIG. 5 is a graph illustrating a change in oxygen storage capacity of a three-way catalyst according to the driving distance.

On the other hand, research is being actively conducted on how to accurately predict and control the state of the catalyst so as to improve the purification ability of the catalyst in order and to suppress the cost increase of the catalyst by reducing the amount of the precious metals in the catalyst. In particular, a three-way catalyst (TWC) mounted in a gasoline engine disclosed in Korean Patent Document (Korean Patent Publication No. 10-2003-0021453, filed on Sep. 6, 2001) is known to have a characteristic of effectively purifying CO/HC/NOx which are three main emission components contained in the exhaust gas under theoretical air-fuel ratio conditions. As illustrated in FIG. 5 of the Korean Patent Document, as the driving distance of a vehicle increases, an oxygen storage capacity (OSC) is reduced due to a deterioration of catalyst. For this reason, in order to optimally control the three-way catalyst, it is desired to accurately model a catalyst state such as an oxygen storage capacity (OSC) or an oxygen storage amount and to appropriately control a control variable, such as a catalyst heating time or an oxygen purge time, according to the catalyst state.

In order to calculate the oxygen storage amount (OSA) in the three-way catalyst, an oxygen sensor and an exhaust gas flow rate provided at the front end of the catalyst may be used. However, we have discovered that when the catalyst is deteriorated or the oxygen storage capacity (OSC) is changed according to the catalyst temperature and the exhaust flow rate as illustrated in FIG. 5, there may be an error in the oxygen storage amount (OSA) calculation model of the catalyst.

On the other hand, we have also found that a linear oxygen sensor at the front end of the catalyst plays an important role in calculating the oxygen mass flow rate flowing into the catalyst as described above, but it may change the air-fuel ratio detection characteristic of the exhaust gas due to poisoning or deterioration of the oxygen sensor. Hence, when the oxygen storage amount is calculated or corrected using the measured value of the linear oxygen sensor at the front end of the catalyst, there is a possibility that an error continues to occur in the oxygen storage amount model. Therefore, in order to reduce the error of the oxygen storage amount model in the catalyst and to use various control logic using the same, an accurate oxygen storage amount calculation method is desired.

SUMMARY

The present disclosure provides an exhaust gas purification system and method capable of accurately calculating an oxygen storage amount of a three-way catalyst and optimally setting control variables related to the performance of the three-way catalyst based on the same.

Other objects and advantages of the present disclosure can be understood by the following description, and become apparent with reference to the forms of the present disclosure. Also, it is obvious to those skilled in the art to which the present disclosure pertains that the objects and advantages of the present disclosure can be realized by the means as claimed and combinations thereof.

In some forms of the present disclosure, a method of purifying exhaust gas discharged from an engine of a vehicle using a three-way catalyst may include: calculating, by a controller, an oxygen mass flow rate flowing into the three-way catalyst based on an air-fuel ratio and an exhaust gas flow rate measured by a front oxygen sensor arranged at a front end of the three-way catalyst; calculating, by the controller, an oxygen storage capacity (OSC) and an oxygen storage amount (OSA) of the three-way catalyst by integrating the oxygen mass flow rate; correcting, by the controller, the calculated oxygen storage amount based on an actual voltage measurement value of the exhaust gas measured by a rear oxygen sensor arranged at a rear end of the three-way catalyst; and controlling, by the controller, at least one control variable related to performance of the three-way catalyst based on the corrected oxygen storage amount and the oxygen storage capacity.

In some forms of the present disclosure, even when there is an error in the result of the oxygen storage amount calculated by the front oxygen sensor at the front end of the three-way catalyst, it is possible to accurately calculate the oxygen storage amount of the three-way catalyst by correcting the error based on an actual voltage measurement value by the rear oxygen sensor at the rear end of the catalyst. Therefore, it is possible to optimally set the control variable related to the performance of the three-way catalyst.

In correcting the calculated oxygen storage amount, when the actual voltage measurement value by the rear oxygen sensor at the rear end of the three-way catalyst is equal to or greater than a predetermined first reference value ($O_2$ Empty), the oxygen storage amount may have a value set to zero ("0"), regardless of the calculation result of the oxygen storage amount.

In some forms of the present disclosure, correcting the calculated oxygen storage amount include: when the calculated oxygen storage amount is equal to or greater than a predetermined value and the actual voltage measurement value by the rear oxygen sensor at the rear end of the three-way catalyst is equal to or greater than a predetermined second reference value ($O_2$ Small), determining that there is an error in the calculated oxygen storage amount;

determining a correction value of the calculated oxygen storage amount; and subtracting the determined correction value from the calculated oxygen storage amount.

In one form, when the calculated oxygen storage amount has a value less than a predetermined value and the actual voltage measurement value by the rear oxygen sensor at the rear end of the three-way catalyst is less than or equal to a predetermined third reference value ($O_2$ Large), it is determined that there is an error in the calculated oxygen storage amount, and the calculated oxygen storage amount may be corrected by determining a correction value of the oxygen storage amount and then adding the determined correction value to the calculated oxygen storage amount.

In correcting the calculated oxygen storage amount, when the actual voltage measurement value by the rear oxygen sensor at the rear end of the three-way catalyst is less than or equal to a predetermined fourth reference value ($O_2$ Full), the calculated oxygen storage amount is maintained without any correction.

The oxygen storage capacity may be calculated, in a fuel cut state of the engine, by integrating the oxygen mass flow rate from a state in which oxygen is completely removed from the three-way catalyst to a state in which the three-way catalyst is full of oxygen.

The method may further include correcting, by the controller, the calculated oxygen storage capacity based on a temperature of the three-way catalyst, which reflects the influence of the temperature of the three-way catalyst on the oxygen storage capacity.

The method may further include correcting, by the controller, the calculated oxygen storage capacity based on the flow rate of the exhaust gas (the exhaust gas flow rate), which reflects the influence of the flow rate of the exhaust gas on the oxygen storage capacity.

The at least one control variable affecting the performance of the three-way catalyst may include at least one of a catalyst heating time of the three-way catalyst, an oxygen purge time after fuel cut, a lambda rich control period while the vehicle is decelerated, a high RPM holding period, or an ignition timing holding period of the engine.

In accordance with another form of the present disclosure, a system for purifying exhaust gas of an engine for a vehicle includes: a three-way catalyst disposed on an exhaust line through which the exhaust gas of the engine passes, and configured to remove harmful substances contained in the exhaust gas; a front oxygen sensor and a rear oxygen sensor, which are respectively provided at a front end and a rear end of the three-way catalyst; and a controller configured to: calculate an oxygen mass flow rate flowing into the three-way catalyst based on an air-fuel ratio and an exhaust gas flow rate measured by the front oxygen sensor at the front end of the three-way catalyst, correct the oxygen storage amount based on an actual voltage measurement value of the exhaust gas measured by the rear oxygen sensor at the rear end of the three-way catalyst, and control at least one control variable related to performance of the three-way catalyst based on the corrected oxygen storage amount and the oxygen storage capacity.

The at least one control variable may include at least one of a catalyst heating time of the three-way catalyst, an oxygen purge time after fuel cut, a lambda rich control period while the vehicle is decelerated, a high RPM holding period, or an ignition timing holding period of the engine.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

Exemplary forms of the present disclosure will be described below in more detail with reference to the accompanying drawings. The present disclosure may, however, be embodied in different forms and should not be construed as limited to the forms set forth herein. Rather, these exemplary forms are provided so that this disclosure will be thorough and complete, and will fully convey the scope of the present disclosure to those skilled in the art. Throughout the disclosure, like reference numerals refer to like parts throughout the various figures and forms of the present disclosure.

Figure 1:
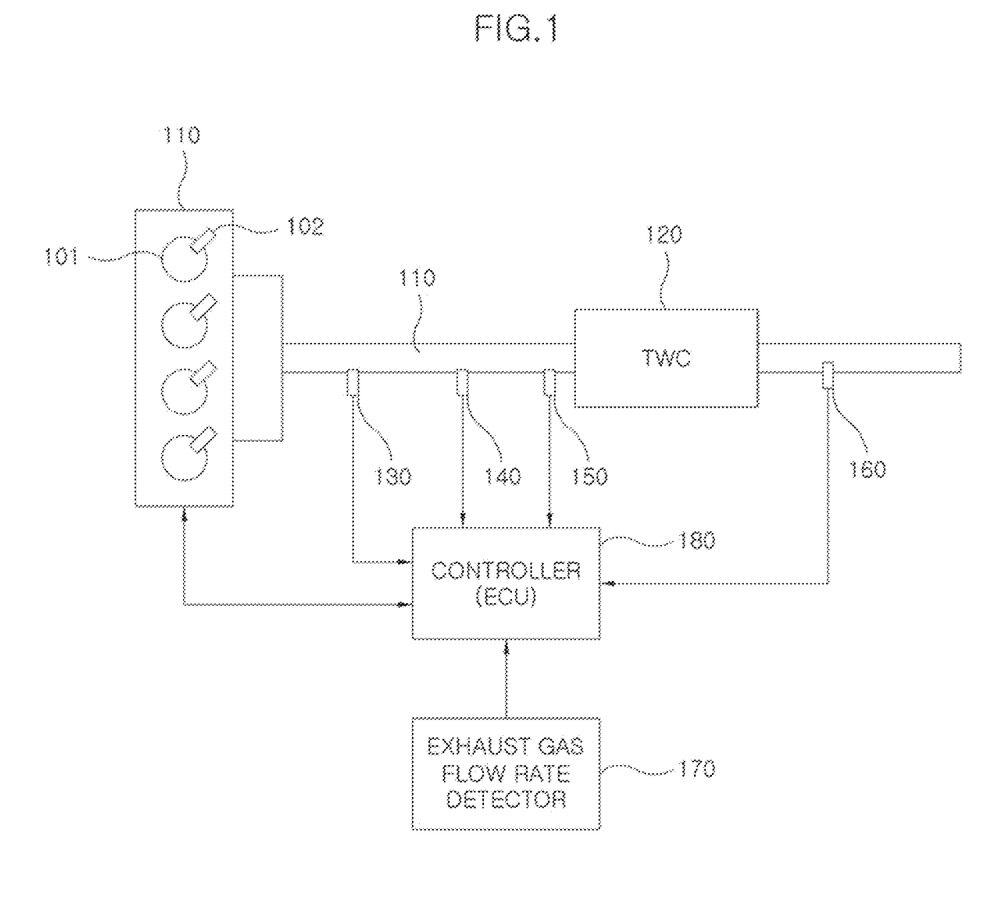
FIG. 1 is a diagram schematically illustrating a structure of an exhaust gas purification system according to one form of the present disclosure.

FIG. 1 is a diagram schematically illustrating a structure of an exhaust gas purification system according to one form of the present disclosure.

Referring to FIG. 1, the purification system includes: an engine 100, a combustion chamber 101, an injector 102, an exhaust line 110, a three-way catalyst 120, a linear oxygen sensor 130 at the front end of the catalyst, an exhaust gas temperature sensor 140, an exhaust gas pressure sensor 150, a binary oxygen sensor 160 at the rear end of the catalyst, an exhaust gas flow rate detector 170, and a controller 180.

In the engine 100 illustrated in FIG. 1, fresh air supplied from an intake system of a vehicle is supplied to the combustion chamber 101 in a cylinder through an intake valve (not illustrated). In addition, fuel transported from a fuel tank is supplied to the combustion chamber 101 in the cylinder through the injector 102. Although the injector 102 injects fuel directly into the combustion chamber in the engine 100 illustrated in FIG. 1, the method according to the exemplary forms of the present disclosure are not limited to the engine in the above manner, but may of course also be applied to an engine in which a mixture of fuel and air is supplied into a combustion chamber through an intake valve.

The fuel injected into the combustion chamber is ignited in the combustion chamber 101 for combustion. The exhaust gas generated after combustion is discharged to the exhaust line 110 of an exhaust system through an exhaust valve.

The exhaust gas discharged to the exhaust line 110 is discharged out of the vehicle after the harmful components of the exhaust gas are removed by the three-way catalyst 120 in a catalytic converter. The three-way catalyst 120 converts harmful substances, including carbon monoxide, hydrocarbon, and nitrogen oxide contained in the exhaust gas, into harmless components by oxidation-reduction reaction.

Meanwhile, the oxygen sensors 130 and 160 are installed upstream and downstream of the three-way catalyst 120 on the exhaust line 110, respectively, to detect the oxygen concentration in the exhaust gas.

In one form, the oxygen sensor 130 installed upstream of the three-way catalyst 120 is a linear oxygen sensor that detects an air-fuel ratio (lambda value) of the exhaust gas passing through the exhaust line 110 to transmit the detected signal to the controller 180.

In another form, the oxygen sensor 160 installed downstream of the three-way catalyst 120 is a binary oxygen sensor that measures an oxygen concentration in the exhaust gas having passed through the three-way catalyst 120 to transmit the measured signal to the controller 180.

The exhaust gas temperature sensor 140 is installed upstream or downstream of the three-way catalyst 120 and measures a temperature of the exhaust gas, a temperature of the three-way catalyst, or the like to transmit the measured signal to the controller 180.

The exhaust gas pressure sensor 150 is installed upstream or downstream of the three-way catalyst 120 and measures a pressure of the exhaust gas to transmit the measured signal to the controller 180.

The exhaust gas flow rate detector 170 calculates a flow rate of the exhaust gas through an intake air flow rate, a fuel injection amount, and an exhaust gas temperature, or directly measures an exhaust flow rate using an exhaust gas flow rate sensor, or detects an exhaust gas flow rate by selecting a flow rate value from map data set according to an operating condition, to transmit the calculated, measured, or detected signal to the controller 180.

The controller (electronic control unit (ECU)) 180 calculates an oxygen mass flow rate ($m_{O2}$) flowing into the three-way catalyst 120 based on the flow rate information of the exhaust gas transmitted from the exhaust gas flow rate detector 170, the temperature and pressure information of the exhaust gas transmitted from the exhaust gas temperature sensor 140 and the exhaust gas pressure sensor 150, and the air-fuel ratio information transmitted from the linear oxygen sensor 130 at the front end of the catalyst, and calculates an oxygen storage amount (OSA) and oxygen storage capacity (OSC) of the three-way catalyst 120 based on the calculated oxygen mass flow rate ($m_{O2}$).

When an actual measured voltage value of the binary oxygen sensor 160 at the rear end of the three-way catalyst 120 differs from a predicted voltage value of the oxygen sensor predicted from the calculated oxygen storage amount (OSA) and oxygen storage capacity (OSC) of the three-way catalyst 120, the controller 180 corrects the calculated oxygen storage amount (OSA) using the actual measured voltage value of the binary oxygen sensor 160 and the calculated oxygen storage amount (OSA).

The controller 180 controls the control variables related to the performance of the three-way catalyst 120 based on the finally calculated oxygen storage amount (OSA) and oxygen storage capacity (OSC), thereby improving the purification ability of the three-way catalyst 120. In some forms of the present disclosure, the control variables related to the performance of the three-way catalyst 120 include: one or more of a catalyst heating time of the three-way catalyst 120, an oxygen purge time after fuel cut, a lambda rich control period on deceleration, and a high RPM holding period or ignition timing holding period of the engine. The controller 180 controls an injector, intake valve, an exhaust valve, an igniter, and the like based on the control variables or the like to adjust a fuel injection amount, a fuel ignition timing, or the like, thereby performing catalyst activation control, catalyst purge control, or the like. A specific control method performed by the controller 180 will be described in more detail below.

Figure 2:
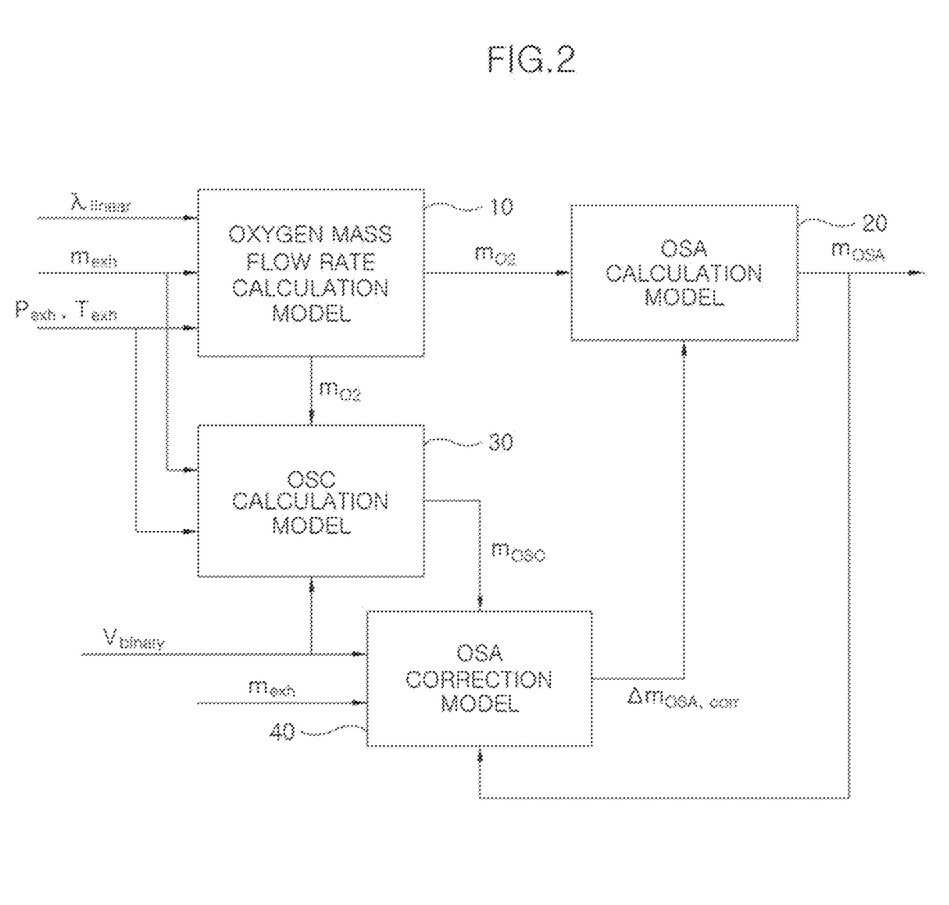
FIG. 2 is a signal processing schematic diagram illustrating a control method according to one form of the present disclosure.

FIG. 2 is a signal processing schematic diagram related to a control method according to one form of the present disclosure, performed by the controller 180 of FIG. 1.

The controller 180 includes an oxygen mass flow rate calculation model 10, an oxygen storage amount (OSA) calculation model 20, an oxygen storage capacity (OSC) calculation model 30, and an oxygen storage amount (OSA) correction model 40.

The oxygen mass flow rate calculation model 10 calculates the oxygen mass flow rate ($m_{O2}$) in the exhaust gas flowing into the three-way catalyst 120 based on the air-fuel ratio ($\lambda_{linear}$) transmitted from the linear oxygen sensor 130 at the front end of the three-way catalyst 120, the exhaust gas flow rate ($m_{exh}$) transmitted from the exhaust gas flow rate detector 170, the exhaust gas temperature ($T_{exh}$) transmitted from the exhaust gas temperature sensor 140 and the exhaust gas pressure ($P_{exh}$) transmitted from the exhaust gas pressure sensor 150.

In one form, the oxygen mass flow rate ($m_{O2}$) in the exhaust gas is calculated by the following Equation 1:

$$m_{02} = 0.23 \times \left(1 - \frac{1}{\lambda_{linear}}\right) \times m_{exh}(P_{exh}, T_{exh}). \quad \text{(Equation 1)}$$

According to the exhaust gas temperature ($T_{exh}$) and the exhaust gas pressure ($P_{exh}$), the gas characteristics are changed at the same exhaust gas flow rate ($m_{exh}$). Accordingly, as disclosed in Equation 1, in order to accurately calculate the oxygen mass flow rate ($m_{O2}$) in the exhaust gas, it is desired to substitute the value ($m_{exh}(P_{exh}, T_{exh})$) obtained by correcting the exhaust gas flow rate ($m_{exh}$) using the exhaust gas temperature (Texh) and the exhaust gas pressure ($P_{exh}$).

The oxygen storage amount (OSA) calculation model 20 calculates the oxygen storage amount of the three-way catalyst 120 by integrating the oxygen mass flow rate ($m_{O2}$) calculated by the oxygen mass flow rate calculation model 10.

In another form, the oxygen storage amount (OSA) is calculated by integrating the oxygen mass flow rate ($m_{O2}$) from the time of fuel cut to the time when the voltage of the binary oxygen sensor 160 at the rear end of the three-way catalyst 120 indicates a lean air-fuel ratio.

The oxygen storage capacity (OSC) calculation model 30 calculates the oxygen storage capacity (OSC) of the three-way catalyst 120 by integrating the oxygen mass flow rate ($m_{O2}$) calculated by the oxygen mass flow rate calculation model 10.

When the fuel cut is performed, the supply of the fuel into the combustion chamber 101 is stopped so that air containing no fuel flows into the exhaust line 110. Thus, the oxygen concentration in the exhaust gas increases and the increased excess oxygen is occluded by the three-way catalyst 120. If the fuel cut is held so that the lean mixture continues to be supplied beyond the oxygen storage capacity of the catalyst ($O_2$ full state in FIG. 4), the voltage value (the oxygen concentration at the rear end of the catalyst) output by the binary oxygen sensor 160 installed at the rear end of the three-way catalyst 120 indicates a lean air-fuel ratio, as illustrated in FIG. 4, similar to that indicated by the voltage value output from the upstream linear oxygen sensor 130.

Accordingly, the amount of excess oxygen in the exhaust gas, which has passed through the catalyst from the time when the fuel cut is performed to the time when the voltage output from the binary oxygen sensor 160 at the rear end of the three-way catalyst 120 is switched to indicate the lean air-fuel ratio, corresponds to the oxygen storage capacity of the catalyst.

Therefore, the oxygen storage capacity (OSC) of the catalyst is calculated by integrating the oxygen flow rate from a state in which oxygen is completely removed from the three-way catalyst 120 to a state in which the three-way catalyst 120 is full of oxygen If there is an error in the oxygen storage amount calculated by the oxygen storage amount (OSA) calculation model 20, the oxygen storage amount (OSA) correction model 40 corrects the oxygen storage amount (OSA) using the output voltage value of the binary oxygen sensor 160 at the rear end of the three-way catalyst 120 and the oxygen storage amount (OSA) calculated by the oxygen storage amount (OSA) calculation model 20.

Figure 4:
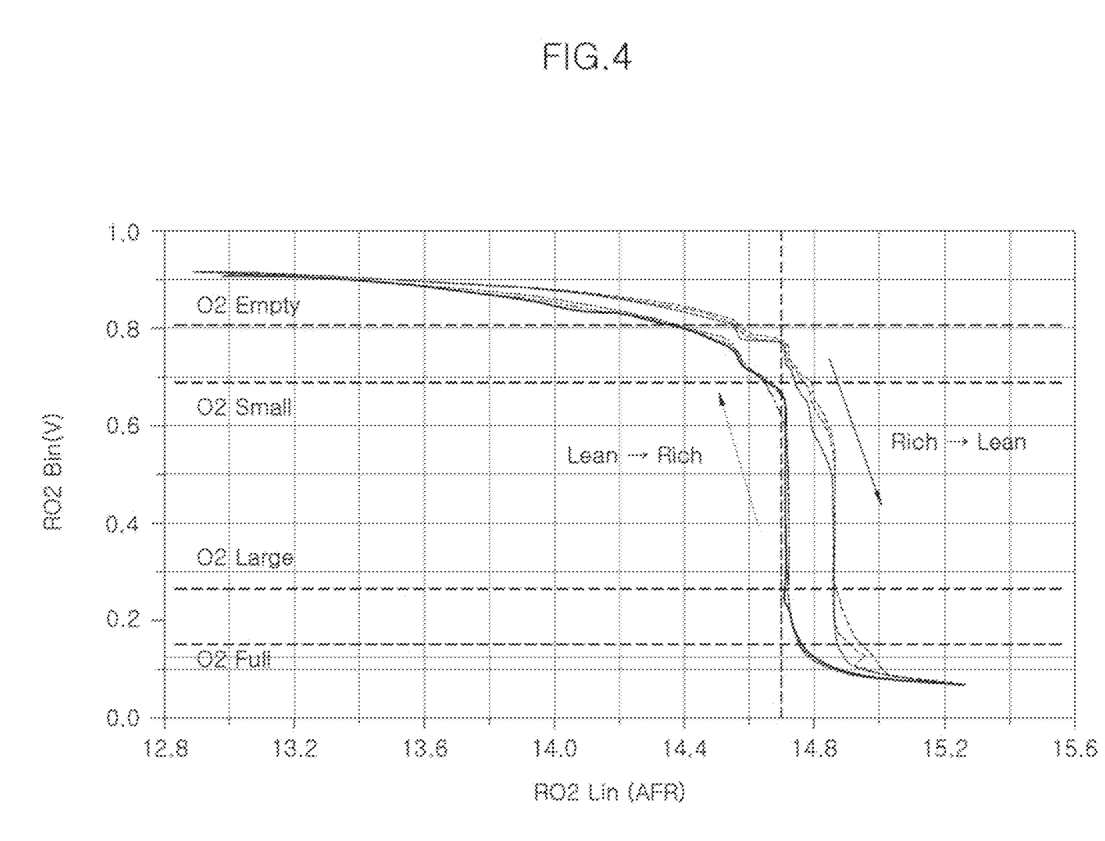
FIG. 4 is a graph illustrating a relationship between an air-fuel ratio and an output voltage value of an oxygen sensor at the rear end of a catalyst.

As illustrated in FIG. 4, the output voltage value (V) indicative of the oxygen concentration measured by the binary oxygen sensor 160 at the rear end of the three-way catalyst 120 is rapidly changed when the air-fuel ratio at the rear end of the three-way catalyst 120 changes from rich to lean and from lean to rich. In order to properly correct the oxygen storage amount (OSA) using such a change, in the oxygen storage amount (OSA) correction model 40, the output voltage value of the binary oxygen sensor 160 at the rear end of the three-way catalyst 120 is defined as a plurality of steps (four steps in the present disclosure) according to the magnitude thereof.

The first reference value ($O_2$ Empty) is a predetermined boundary value to indicate that oxygen is not explicitly present in the three-way catalyst 120. Accordingly, when the actual voltage output value (V) of the binary oxygen sensor 160 is equal to or greater than the first reference value ($O_2$ Empty), the value of the oxygen storage amount (OSA) of the three-way catalyst 120 is set to "0", regardless of the magnitude of the calculated oxygen storage amount (OSA).

The fourth reference value ($O_2$ Full) is a predetermined boundary value to indicate that the three-way catalyst 120 is full of oxygen (i.e., the oxygen storage capacity is 100%). Accordingly, when the actual voltage output value (V) of the binary oxygen sensor 160 at the rear end of the three-way catalyst 120 is equal to or less than the fourth reference value ($O_2$ Full), the value of the oxygen storage amount is set to the oxygen storage capacity (OSC) calculated by the oxygen storage capacity (OSC) calculation model 30, regardless of the magnitude of the calculated oxygen storage amount (OSA).

When the actual voltage output value (V) of the binary oxygen sensor 160 is between the first reference value and the fourth reference value, oxygen may not be saturated in the three-way catalyst 120. Even in this case, as illustrated in FIG. 4, it is possible to define a voltage value that may check the state from rich to lean or from lean to rich. That is, even though hysteresis is present in the oxygen sensor signal, when it is lower than at least the second voltage value ($O_2$ Small), it may be assumed that the exhaust gas having passed through the three-way catalyst 120 is switched from lean to rich, whereas when it is lower than at least the third voltage value ($O_2$ Large), it may be assumed that the exhaust gas having passed through the three-way catalyst 120 is switched from rich to lean.

In one form, even though the oxygen storage amount (OSA) calculated by the oxygen storage amount (OSA) calculation model 20 is equal to or larger than a certain amount (i.e., even though the three-way catalyst 120 occludes a considerable amount of oxygen), when the actual voltage output value (V) of the binary oxygen sensor 160 is still between the first reference value and the second reference value, i.e., is higher than the second voltage value ($O_2$ Small), it may be inferred that there is an error in the oxygen storage amount (OSA) calculated by the oxygen storage amount (OSA) calculation model 20.

In some forms of the present disclosure, even though the oxygen storage amount (OSA) calculated by the oxygen storage amount (OSA) calculation model 20 is less than the certain amount (i.e., even though the three-way catalyst 120 does not occlude a considerable amount of oxygen), when the actual voltage output value (V) of the binary oxygen sensor 160 is still between the third reference value and the fourth reference value, i.e., is lower than the third voltage value ($O_2$ Large), it may be inferred that there is an error in the oxygen storage amount (OSA) calculated by the oxygen storage amount (OSA) calculation model 20.

In this case, in order to compensate for the error of the oxygen storage amount (OSA), when the actual output voltage value (V) is higher than the second voltage value (Os Small), the oxygen storage amount is corrected by subtracting a predetermined correction value from the oxygen storage amount (OSA) calculated by the oxygen storage amount (OSA) calculation model 20, whereas when the actual output voltage value (V) is lower than the third voltage value (Os Small), the oxygen storage amount is corrected by adding a predetermined correction value to the oxygen storage amount (OSA) calculated by the oxygen storage amount (OSA) calculation model 20.

Here, the correction value may be determined from a predetermined model. For example, a table that sets a difference between the predicted output voltage value of the binary oxygen sensor 160, predicted from the current oxygen storage amount (OSA) and oxygen storage capacity (OSC) thereof, and the actual output voltage value (V) thereof, and an additional oxygen mass flow rate ($\Delta m_{OSA,corr}$) desired to resolve the difference is stored in the controller 180 or the like, in which case the oxygen mass flow rate ($\Delta m_{OSA,corr}$) desired for correction may be set based on the calculated oxygen storage amount (OSA) and oxygen storage capacity (OSC) and the actual output value (V) and stored set of the binary sensor. When the oxygen mass flow rate ($\Delta m_{OSA,corr}$) desired for correction is obtained, in a similar manner as in the calculation of the oxygen storage amount (OSA), the oxygen storage amount (OSA) may be corrected by integrating the obtained oxygen mass flow rate ($\Delta m_{OSA,corr}$) in proportion to the flow rate of the exhaust gas to calculate a correction value and by subtracting or adding the calculated correction value.

Meanwhile, the oxygen storage capacity (OSC) of the three-way catalyst 120 is affected by the catalyst temperature ($T_{CAT}$) and the exhaust gas flow rate ($m_{exh}$). For example, the purification efficiency of the catalyst increases as the temperature of the catalyst increases, and the oxygen storage capacity (OSC) of the catalyst measured at this time also increases. In addition, assuming that other conditions are the same, the reaction time between the exhaust gas and the three-way catalyst 120 decreases as the flow rate of the exhaust gas increases, which may calculate a relatively smaller oxygen storage capacity (OSC) than the actual one. Accordingly, in order to accurately determine the current state of the three-way catalyst 120, the oxygen storage capacity calculation model 30 calculates the oxygen storage capacity (OSC) based on the catalyst temperature ($T_{CAT}$) and the exhaust gas flow rate ($m_{exh}$). To this end, a table map that sets the relationship between the oxygen storage capacity (OSC) and the catalyst temperature ($T_{CAT}$) and a table map that sets the relationship between the oxygen storage capacity (OSC) and the exhaust gas flow rate ($m_{exh}$) are stored in the controller 180 or the like, in which case a new oxygen storage capacity (OSC) reflecting the influence of the catalyst temperature and the exhaust gas flow rate may be set based on the tables and the calculated oxygen storage capacity (OSC).

The controller 180 may be implemented in the form of an in-vehicle computer. In this case, a program for implementing this control function may be recorded on a computer-readable recording medium, and the program recorded on the recording medium may be read and executed by a computer system. The term "computer system" used herein is a computer system built in the vehicle and may include hardware such as an OS and a peripheral device. The term "computer-readable recording medium" refers to a storage device such as a flexible disk, an optical magnetic disk, a portable medium such as a ROM or a CD-ROM, or a hard disk built into a computer system. In addition, the term "computer-readable recording medium" may include a medium that dynamically holds a program in a short time, as in a communication line when the program is transmitted through a network such as the Internet or the communication line such as a telephone line, and a medium that holds a program for a certain period of time, as in a volatile memory within in a computer system which becomes a client or a server in the above case. The program may be used for executing some of the above-mentioned functions, or may be implemented in combination with a program already recorded in the computer system.

In addition, all or some models of the controller 180 in the form mentioned above may be implemented as integrated circuits such as large scale integration (LSI). Each model of the controller 180 may be individually processorized, or all or some thereof may be integrated and processorized. In addition, the technique of integrated circuit is not limited to LSI, but may be implemented by a dedicated circuit or a general purpose processor. Moreover, when the technique of integrated circuit which replaces LSI appears by the advance of semiconductor technology, the integrated circuit by that technique may be used.

Figure 3:
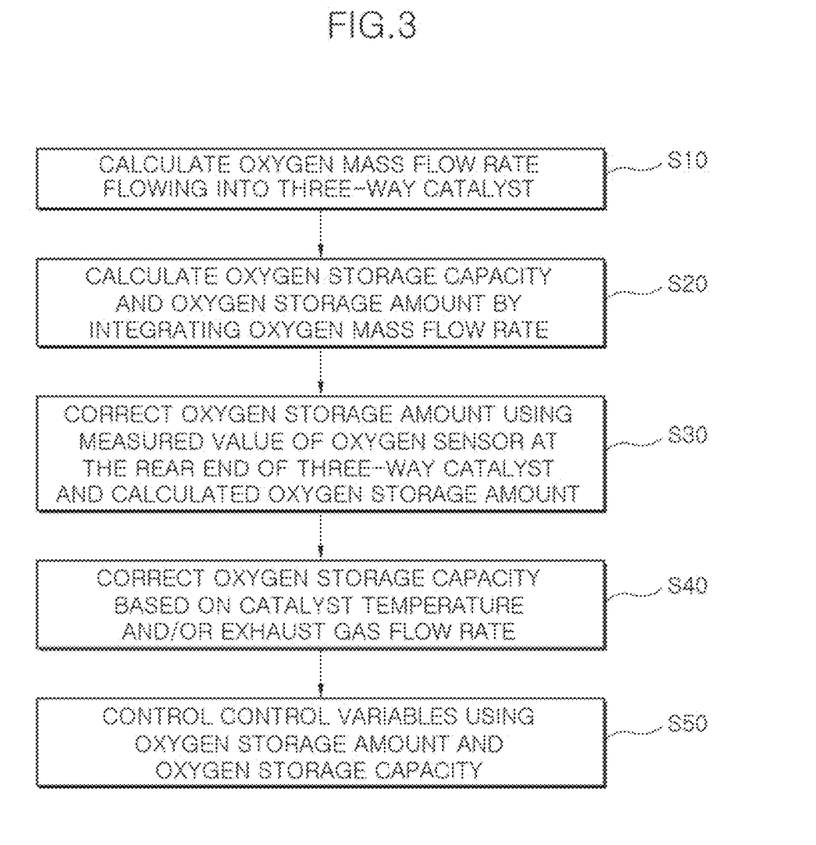
FIG. 3 is a flowchart illustrating an exhaust gas purification method according to one form of the present disclosure.

FIG. 3 is a flowchart illustrating the exhaust gas purification method according to the illustrated form in FIG. 2.

Referring to FIG. 3, in the control method according to the exemplary form of the present disclosure, first, the oxygen mass flow rate calculation model 10 of the controller 180 calculates the oxygen mass flow rate ($m_{O2}$) flowing into the three-way catalyst 120, based on the air-fuel ratio measured by the linear oxygen sensor 130 at the front end of the three-way catalyst 120 and the exhaust gas flow rate ($m_{exh}$) detected by the exhaust gas flow rate detector 170 (S10).

When the oxygen mass flow rate calculation model 10 calculates the oxygen mass flow rate ($m_{O2}$), the oxygen storage amount (OSA) calculation model 20 and the oxygen storage capacity (OSC) calculation model 30 calculate the oxygen storage capacity (OSC) and oxygen storage amount (OSA) of the three-way catalyst, respectively, by integrating the calculated oxygen mass flow rate ($m_{O2}$)(S20).

When there is an error in the oxygen storage amount calculated by the oxygen storage amount (OSA) calculation model 20, the oxygen storage amount (OSA) correction model 40 corrects the oxygen storage amount (OSA) using the output voltage value of the binary oxygen sensor 160 at the rear end of the three-way catalyst 120 and the oxygen storage amount (OSA) calculated by the oxygen storage amount (OSA) calculation model 20 (S30).

Specially, as described above, when the actual voltage output value (V) of the binary oxygen sensor 160 is equal to or greater than the first reference value ($O_2$ Empty), the value of the oxygen storage amount (OSA) of the three-way catalyst 120 is set to "0", regardless of the magnitude of the calculated oxygen storage amount (OSA). When the actual voltage output value (V) of the binary oxygen sensor 160 at the rear end of the three-way catalyst 120 is equal to or less than the fourth reference value ($O_2$ Full), the value of the oxygen storage amount (OSA) is set to the oxygen storage capacity (OSC) calculated by the oxygen storage capacity (OSC) calculation model 30, regardless of the magnitude of the calculated oxygen storage amount (OSA).

In the case where the oxygen storage amount (OSA) calculated by the oxygen storage amount (OSA) calculation model 20 is equal to or larger than a certain amount, when the actual voltage output value (V) of the binary oxygen sensor 160 is higher than the second voltage value ($O_2$ Small), the oxygen storage amount (OSA) is corrected by subtracting a predetermined correction value from the oxygen storage amount (OSA) calculated by the oxygen storage amount (OSA) calculation model 20.

On the other hand, in the case where the oxygen storage amount (OSA) calculated by the oxygen storage amount (OSA) calculation model 20 is less than the certain amount, when the actual voltage output value (V) of the binary oxygen sensor 160 is lower than the third voltage value ($O_2$ Large), the oxygen storage amount is corrected by adding a predetermined correction value to the oxygen storage amount (OSA) calculated by the oxygen storage amount (OSA) calculation model 20. In this case, the correction value may be determined by the method as described above.

As described above, the oxygen storage capacity (OSC) of the three-way catalyst 120 is affected by the catalyst temperature ($T_{CAT}$) and the exhaust gas flow rate ($m_{exh}$). Accordingly, in order to accurately determine the current state of the three-way catalyst 120, the oxygen storage capacity calculation model 30 corrects the oxygen storage capacity (OSC) based on the catalyst temperature ($T_{CAT}$) and the exhaust gas flow rate ($m_{exh}$)(S40).

For example, the table map that sets the relationship between the oxygen storage capacity (OSC) and the catalyst temperature ($T_{CAT}$) and the table map that sets the relationship between the oxygen storage capacity (OSC) and the exhaust gas flow rate ($m_{exh}$) are stored in the controller 180 or the like, in which case an oxygen storage capacity (OSC) reflecting the influence of the catalyst temperature and the exhaust gas flow rate may be set based on the tables and the calculated oxygen storage capacity (OSC).

When the oxygen storage amount (OSA) and the oxygen storage capacity (OSC) are determined as described above, the controller 180 controls the control variables related to the performance of the three-way catalyst 120 based on the finally calculated oxygen storage amount (OSA) and oxygen storage capacity (OSC), thereby improving the purification ability of the three-way catalyst 120 (S50). As described above, the control variables related to the performance of the three-way catalyst 120 include one or more of the catalyst heating time of the three-way catalyst 120, the oxygen purge time after fuel cut, the lambda rich control period on deceleration, and the high RPM holding period or ignition timing holding period of the engine. The controller 180 controls the injector intake valve, the exhaust valve, the igniter, and the like based on the control variables or the like to adjust the fuel injection amount, the fuel ignition timing, or the like, thereby maintaining the performance of the three-way catalyst 120 at the optimal conditions. For example, when the oxygen storage amount (OSA) of the three-way catalyst 120 is above a certain level and the oxygen storage capacity (OSC) is deteriorated, the catalyst is controlled to be regenerated as soon as possible by advancing the oxygen purge time after fuel cut.

In accordance with exemplary forms of the present disclosure, even when there is an error in the calculation result of the oxygen storage amount in the catalyst due to the deterioration of the catalyst, the poisoning of the oxygen sensor at the front end of the catalyst, or the like, it is possible to accurately calculate the oxygen storage amount of the three-way catalyst by correcting the error based on the measurement result of the oxygen sensor at the rear end of the catalyst.

In addition, by optimally controlling the control variables related to the performance of the three-way catalyst using the calculated oxygen storage amount, it is possible to optimally maintain the purification efficiency of the catalyst and to meet the strengthened emission regulations.

While the present disclosure has been described with respect to the specific forms, it will be apparent to those skilled in the art that various changes and modifications may be made without departing from the spirit and scope of the present disclosure.

What is claimed is:

1. A method of purifying exhaust gas discharged from an engine of a vehicle using a three-way catalyst, comprising:
    calculating, by a controller, an oxygen mass flow rate flowing into the three-way catalyst based on an air-fuel ratio and an exhaust gas flow rate measured by a front oxygen sensor arranged at a front end of the three-way catalyst;
    calculating, by the controller, an oxygen storage capacity (OSC) and an oxygen storage amount (OSA) of the three-way catalyst by integrating the oxygen mass flow rate;
    correcting, by the controller, the calculated oxygen storage amount based on an actual voltage measurement value of the exhaust gas measured by a rear oxygen sensor arranged at a rear end of the three-way catalyst; and
    controlling, by the controller, at least one control variable related to performance of the three-way catalyst based on the corrected oxygen storage amount and the oxygen storage capacity.

2. The method of claim 1, wherein in correcting the calculated oxygen storage amount, when the actual voltage measurement value by the rear oxygen sensor at the rear end of the three-way catalyst is equal to or greater than a predetermined first reference value, the corrected oxygen storage amount has a value set to zero ("0").

3. The method of claim 1, wherein correcting the calculated oxygen storage amount include:
    when the calculated oxygen storage amount is equal to or greater than a predetermined value and the actual voltage measurement value by the rear oxygen sensor at the rear end of the three-way catalyst is equal to or greater than a predetermined second reference value, determining a correction value of the calculated oxygen storage amount, and
    subtracting the determined correction value from the calculated oxygen storage amount.

4. The method of claim 1, wherein correcting the calculated oxygen storage amount include:
    when the calculated oxygen storage amount has a value less than a predetermined value and the actual voltage measurement value by the rear oxygen sensor at the rear end of the three-way catalyst is less than or equal to a predetermined third reference value, determining a correction value of the calculated oxygen storage amount, and
    adding the determined correction value to the calculated oxygen storage amount.

5. The method of claim 1, wherein in correcting the calculated oxygen storage amount, when the actual voltage measurement value by the rear oxygen sensor at the rear end of the three-way catalyst is less than or equal to a predetermined fourth reference value, the calculated oxygen storage amount is maintained.

6. The method of claim 1, wherein calculating the oxygen storage capacity includes: when the engine is in a fuel cut state, integrating the oxygen mass flow rate from a state in which oxygen is completely removed from the three-way catalyst to a state in which the three-way catalyst is full of oxygen.

7. The method of claim 1, further comprising: correcting, by the controller, the calculated oxygen storage capacity based on a temperature of the three-way catalyst.

8. The method of claim 1, further comprising: correcting, by the controller, the calculated oxygen storage capacity based on the exhaust gas flow rate.

9. The method of claim 1, wherein the at least one control variable comprises at least one of a catalyst heating time of the three-way catalyst, an oxygen purge time after fuel cut, a lambda rich control period while the vehicle is decelerated, a high revolutions per minute (RPM) holding period, or an ignition timing holding period of the engine.

10. A system for purifying exhaust gas of an engine for a vehicle, the system comprising:
    a three-way catalyst disposed on an exhaust line through which the exhaust gas of the engine passes, and configured to remove harmful substances contained in the exhaust gas;
    a front oxygen sensor and a rear oxygen sensor, which are respectively provided at a front end and a rear end of the three-way catalyst; and
    a controller configured to:
        calculate an oxygen mass flow rate flowing into the three-way catalyst based on an air-fuel ratio and an exhaust gas flow rate measured by the front oxygen sensor at the front end of the three-way catalyst,
        calculate an oxygen storage capacity and an oxygen storage amount of the three-way catalyst by integrating the oxygen mass flow rate,
        correct the oxygen storage amount based on an actual voltage measurement value of the exhaust gas measured by the rear oxygen sensor at the rear end of the three-way catalyst, and
        control at least one control variable related to performance of the three-way catalyst based on the corrected oxygen storage amount and the oxygen storage capacity.

11. The system of claim 10, wherein the at least one control variable comprises at least one of a catalyst heating time of the three-way catalyst, an oxygen purge time after fuel cut, a lambda rich control period while the vehicle is decelerated, a high revolutions per minute (RPM) holding period, or an ignition timing holding period of the engine.

* * * * *